Jan. 28, 1969　　　　　K. SCHULZ　　　　　3,424,503
SLIDING BEARING WITH YIELDABLY JOURNALLED BUSHING
Filed June 29, 1965

INVENTOR.
Karl Schulz

United States Patent Office 3,424,503
Patented Jan. 28, 1969

3,424,503
SLIDING BEARING WITH YIELDABLY JOURNALLED BUSHING
Karl Schulz, Hannover, Germany, assignor to Continental Gummi-Werke Aktiengesellschaft, Hannover, Germany
Filed June 29, 1965, Ser. No. 467,891
Claims priority, application Germany, July 3, 1964, C 33,316
U.S. Cl. 308—26     2 Claims
Int. Cl. F16c 27/00, 35/00, 33/72

ABSTRACT OF THE DISCLOSURE

The present invention relates to a sliding bearing having a housing into which is inserted a tubular rubber body which has a bushing of glass fiber reinforced polyamide arranged therein and connected to said rubber body, while a sleeve of porous sinter metal saturated with one or more lubricants so as to form a sleeve of porous self-lubricating sinter metal is arranged with slide fit in said bushing for receiving therein a member to be rotatably journalled in said bearing.

---

The present invention relates to a sliding bearing having a housing into which is inserted a rubber body which has a bushing universally yieldably arranged therein. A part, e.g. a shaft, slidably arranged in said bushing requires continuous servicing in order to maintain the required lubrication. Bushings of synthetic material with lubricants therein or with lubricating characteristics such as nylon are either for many purposes too expensive or, when used on steel, still require servicing or, when used in combination with rubber as yieldable bearing lining, are not feasible in view of their low melting point.

It is, therefore, an object of this invention to provide a sliding bearing of the above mentioned general type, which will overcome the above-outlined drawbacks.

It is another object of this invention to provide a sliding bearing with a rubber body in a housing and a yieldable bushing in the latter, which will be able to absorb both axial as well as radial forces.

It is still another object of this invention to provide a sliding bearing as set forth above which does not require servicing and will have a long life.

These and other objects and advantages of the invention will appear more clearly from the following specification in connection with the accompanying drawings, in which.

A sliding bearing according to the present invention which comprises a housing having a rubber body inserted therein while a bushing is yieldably arranged in said rubber body, is characterized primarily in that said bushing is made of glass fiber reinforced polyamide and is connected to said rubber, while a sleeve of sinter metal, also known as "powdered metal" is slide fitted in said bushing for receiving the part to be journalled in said sliding bearing, e.g. a shaft.

The bearing bushing of polyamide in cooperation with said sleeve made of sinter metal saturated with one or more lubricants has sliding properties which will make the bearing service-free for the required lifetime thereof.

Furthermore, due to its reinforcement with glass fibers, the bushing of polyamide will have a strong structure suitable to absorb mechanical stresses and will have less tolerances. Moreover, due to the embedded glass fibers, the bushing of polyamide has its melting point raised so that it may be built into the rubber body prior to the vulcanization of the rubber body and will not be affected as to its structure by the vulcanization of said rubber body which vulcanization can be taken advantage of for firmly connecting said bushing to said rubber body. The selection of the materials as set forth above for the respective parts and in particular the employment of the sinter metal sleeve permits a multi-purpose employment of the bearing according to the invention independent of the material of the part, e.g. a shaft, to be journalled in said bearing.

Figure 1:
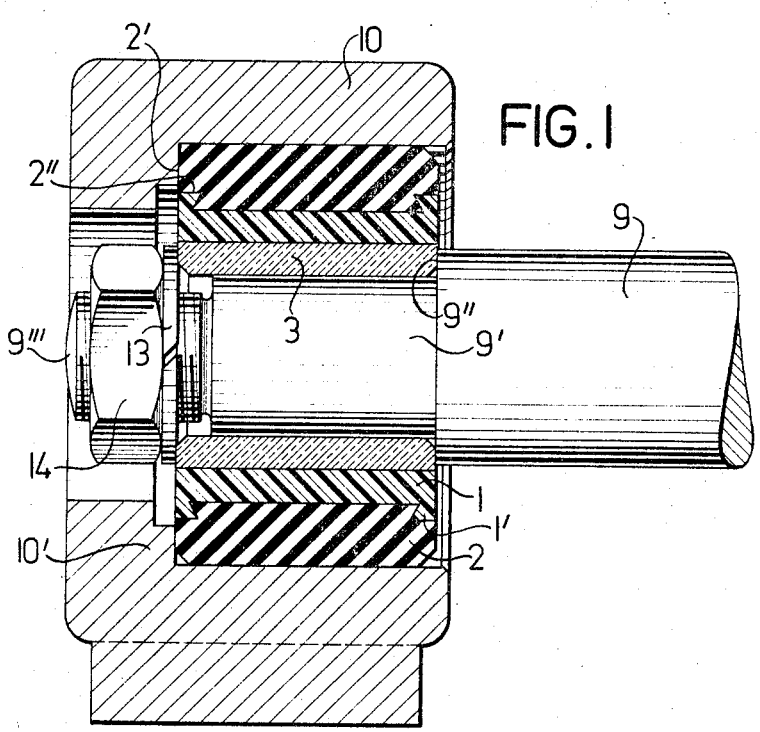
FIGURE 1 represents an axial section through a bearing according to the present invention.

Referring now to the drawing in detail and FIG. 1 thereof in particular, the bearing shown therein comprises a housing 10 having inserted therein under preload a rubber body 2 in the form of a tubular member one end face 2' of which is engaged by a radially inwardly extending flange 10' of housing 10. The peripheral inner surface of rubber body 2 is provided with circular dovetail recesses 2'' engaged by correspondingly shaped annular protrusions 1' of a sleeve or bushing 1 made of polyamide reinforced by glass fibers. Bushing 1 is firmly connected to rubber body 2 by the above-mentioned dovetail arrangement 1', 2''. However, additional means may be provided for effecting a firm connection between rubber body 2 and bushing 1. Thus, advantageously, prior to the vulcanization of said rubber body 2, sleeve 1 is inserted into the vulcanizing mold for vulcanizing said two members 1 and 2 together. If desired, prior to effecting the vulcanization, chemical substances, adapted to aid in promoting the adherence of bushing 1 to said rubber body 2 may be applied to the respective surface portions of the bushing which are to be connected to said rubber body. As an example for such chemical substances may be mentioned epoxy resin.

The bearing shown in FIG. 1 furthermore comprises a sleeve 3 of sinter metal or powdered metal which is slide fitted into bushing 1. The bearing as described above is according to the specific example shown in FIG. 1 mounted on a reduced diameter section 9' of shaft 9 while sleeve 3 is pressed against shaft shoulder 9'' by a washer 13 and nut 14 threadedly engaging a stud 9''' forming one end of shaft 9.

Figure 2:
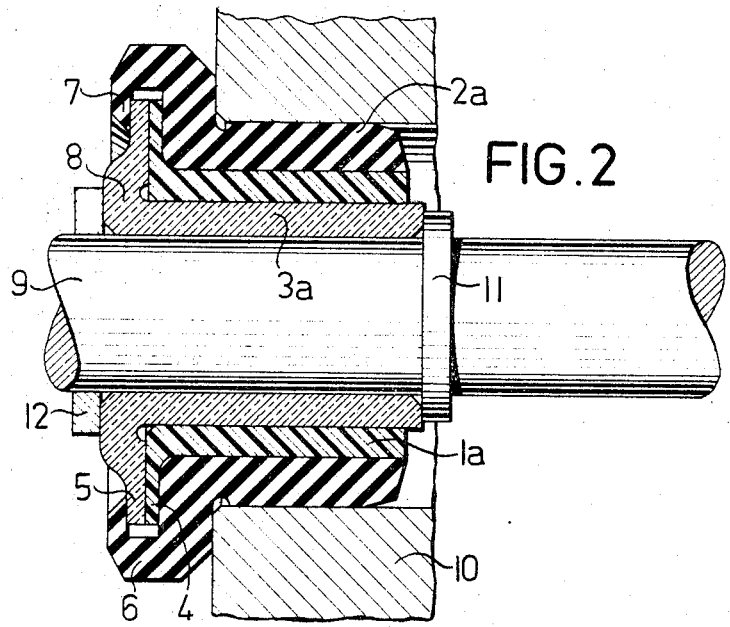
FIGURE 2 is an axial section through a modified bearing according to the present invention for absorbing radial as well as axial forces.

While the arrangement shown in FIG. 1 represents a bearing for absorbing substantially radial forces only, the principle of the present invention also lends itself to the design of bearings adapted to absorb both radial as well as axial forces. Such bearing is shown in FIG. 2, in which the parts corresponding to those of FIG. 1 have been designated with the same reference numerals as in FIG. 1 but with the additional letter a. More specifically with regard to FIG. 2, the bearing shown therein comprises a bushing 1a which is firmly connected to a rubber body 2a, for instance in the same way as described above in connection with bushing 1 and rubber body 2 of FIG. 1.

As will be seen from FIG. 2, sleeve 3a, which is made of sinter metal or powdered metal, and bushing 1a slide fitted into sleeve 3a, are provided with flanges 4 and 5 which are slidable on each other and are adapted to absorb axial forces.

FIG. 2 furthermore shows a bearing housing 10a into which the rubber body 2a has been inserted under preload. Rubber body 2a has a collar 6 protruding radially outwardly and extending around flanges 4 and 5. Collar 6 has a sealing lip 7 engaging the outer end face of flange 5 under a slight preload. Sleeve 3a with the collar 5 beneath sealing lip 7 is adapted to turn so that the sliding surfaces between bushing 1a and sleeve 3a will be protected against the entry of soil and foreign bodies therebetween.

The left-hand side (with regard to the drawing) of sleeve 3a is provided with a protrusion 8 to permit locating and clamping of bushing 3a on a shaft 9a between collar 11 thereof and a clamping ring 12 without the latter contacting sealing lip 7. It may be added that in view of the flange connection 4, 5 embraced by collar 6 with sealing lip 7 under slight preload, the bearing according to the present invention becomes a marketable unit by itself, comprising the elements 1a, 2a and 3a which can be pre-assembled to form said unit for later employment wherever desired. The same applies also to the bearing of FIG. 1.

The bearing shown in FIG. 2 as located at one end portion of shaft 9a will, of course, have a corresponding counterpart—but an image thereto—at the other end portion of shaft 9a.

It is, of course, to be understood, that the present invention is, by no means, limited to the particular constructions shown in the drawings but also comprises any modifications within the scope of the appended claims.

What I claim is:

1. A sliding bearing which comprises: a tubular rubber body, a bushing of glass fiber reinforced polyamide arranged within and connected to said rubber body, and a sleeve of porous self-lubricating sinter metal slide fitted in said bushing for receiving therein a metal to be journalled in said bearing, one end portion of said sleeve and that end portion of said bushing which is adjacent to said one end portion of said sleeve being each provided with a radially outwardly extending flange so that both flanges face and engage each other, and said rubber body being provided with a radially outwardly extending flange portion defining an annular groove and sealing therein the outer marginal areas of said flanges of said sleeve and said bushing respectively, the axially outwardly located portion of said rubber body flange portion forming a sealing lip engaging under slight preload the outside of said flange pertaining to said sleeve.

2. A bearing according to claim 1, in which at least that portion of said flange which is overlapped by said sealing lip is set back from the plane of the adjacent end face of said sleeve in the direction toward the other end face of said sleeve by a distance at least equalling the thickness of said sealing lip.

References Cited
UNITED STATES PATENTS

| | | | |
|---|---|---|---|
| 3,331,642 | 7/1967 | Krauss | 308—36.1 |
| 2,669,491 | 2/1954 | Haller. | |
| 3,039,831 | 6/1962 | Thomas | 308—26 |
| 3,056,709 | 10/1962 | Rising et al. | |
| 3,132,519 | 5/1964 | Federr | 308—26 X |
| 3,133,795 | 5/1964 | Drake | 308—36.1 |
| 2,639,198 | 5/1953 | Kirkham | 308—3.5 |
| 2,897,026 | 7/1959 | Haller | 308—238 |
| 2,943,009 | 6/1960 | Mirsky. | |
| 3,107,946 | 10/1963 | Drake | 308—26 X |
| 3,131,978 | 5/1964 | White | 308—238 |
| 3,155,014 | 11/1964 | Genz | 92—244 |
| 3,160,376 | 12/1964 | Kennedy | 308—3 X |
| 3,304,136 | 2/1967 | Muller | 308—36.1 |
| 3,357,758 | 12/1967 | Miller | 308—36.1 |

MARTIN P. SCHWADRON, *Primary Examiner.*

LUCIOUS L. JOHNSON, *Assistant Examiner.*

U.S. Cl. X.R.

308—36.1, 238